United States Patent [19]

Hattori et al.

[11] Patent Number: 5,212,216
[45] Date of Patent: May 18, 1993

[54] CATIONIC ELECTRODEPOSITION PAINT COMPOSITION CONTAINING COLLOIDAL SILICA-CONTAINING GELLED PARTICULATE

[75] Inventors: Tsutomu Hattori; Hirofumi Masui; Katsuo Iizuka; Satoru Nishigaki, all of Zama; Mitsuyoshi Kitano; Yasuyuki Hirata, both of Hiratsuka, all of Japan

[73] Assignee: Nissan Motor Co., Ltd., Yokohama, Japan

[21] Appl. No.: 565,788

[22] Filed: Aug. 13, 1990

[30] Foreign Application Priority Data

Aug. 14, 1989 [JP] Japan ................................. 1-207824

[51] Int. Cl.$^5$ .............................................. C09D 5/44
[52] U.S. Cl. ...................................... 523/415; 525/108; 525/113; 525/119; 523/404
[58] Field of Search .......................................... 523/415

[56] References Cited

U.S. PATENT DOCUMENTS

| | | | |
|---|---|---|---|
| 3,984,299 | 10/1976 | Jerabek et al. | 204/181 |
| 4,017,438 | 4/1977 | Jerabek et al. | 204/181 |
| 4,330,446 | 5/1982 | Miyosawa | 523/412 |
| 4,525,421 | 6/1985 | Kubota et al. | 523/435 |

FOREIGN PATENT DOCUMENTS 0282000 9/1988 European Pat. Off. .

Primary Examiner—Melvyn I. Marquis
Assistant Examiner—Frederick Krass
Attorney, Agent, or Firm—Pennie & Edmonds

[57] ABSTRACT

A cationic electrodeposition paint composition suitable for a wheel of an automotive vehicle. The paint composition contains an amine-modified epoxy resin and a blocked isocyanate as main components. The paint composition further contains a nonionic emulsified and dispersed type acrylic resin within a range from 6 to 30% by weight in resinous solid content relative to the total resin content of the paint composition, a colloidal silica-containing gelled particulate within a range from 10 to 30 PHR in solid content in paint composition, and an alkyltin ester compound of an aliphatic carboxylic acid within a range from 0.1 to 10 PHR in solid content in the paint composition, thereby improving corrosion resistance of an edge portion of the wheel and a weatherability of a paint film coated on the surface of the steel plate of the wheel.

8 Claims, 1 Drawing Sheet

CATIONIC ELECTRODEPOSITION PAINT COMPOSITION CONTAINING COLLOIDAL SILICA-CONTAINING GELLED PARTICULATE

BACKGROUND OF THE INVENTION

1. Field of the Invention

This invention relates to improvements in a cationic electrodeposition paint composition, and more particularly to a cationic electrodeposition paint composition which is high in an ability for covering an edge portion of a metal plate and high in weatherability.

2. Description of the Prior Art

Hitherto a cationic electrodeposition paint has been prepared by neutralizing a variety of basic resins such as basic epoxy resin, acrylic resin and polyurethane resin with organic, acids and thereafter diluted with water. In order to accomplish an electrodeposition painting, a metal object to be coated with a paint is dipped in the cationic electrodeposition paint and serves as a cathode. Upon passing direct current through the metal object, a paint film is deposited on the surface of the metal object and thereafter baked to be hardened.

It is usual to use the cationic electrodeposition paint including epoxy resin as a main component. Such a cationic electrodeposition paint including epoxy resin is excellent in corrosion resistance of the metal object (plate) to be coated with the paint but is inferior in weatherability. In contrast, another cationic electrodeposition paint including acrylic resin as a main component is excellent in weatherability but inferior in the corrosion resistance of a metal object (plate) coated with the paint. Such a fact is well known in the art.

Additionally, in recent years, an improved cationic electrodeposition paint including epoxy resin as a main component has been proposed to raise an ability of covering an edge portion of a metal plate. Such electrodeposition paints are disclosed for example in Japanese Patent Provisional Publication Nos. 58-204065, 61-293273, 63-266097 and 62-174277.

SUMMARY OF THE INVENTION

It is an object of the present invention to provide an improved cationic electrodeposition paint composition which is higher in its ability of covering the edge portion of a metal object to be coated and is also high in weatherability.

Another object of the present invention is to provide an improved cationic electrodeposition paint composition which securely covers the edge portion produced upon machining a metal object to be coated with the paint while being resistant to chalking; even upon a long time exposure to outdoor conditions.

A first aspect of the present invention resides in a cationic electrodeposition paint composition which comprises an amine-modified epoxy resin; a blocked isocyanate, a nonionic emulsified and dispersed type acrylic resin, a colloidal silica-containing gelled particulate, and an alkyltin ester compound of an aliphatic carboxylic acid.

A second aspect of the present invention resides in a cationic electrodeposition paint composition which comprises an amine-modified epoxy resin; a blocked isocyanate; a nonionic emulsified and dispersed type acrylic resin, the acrylic resin being within a range from 5 to 30% by weight in resinous solid content relative to the total resin content of the paint composition; a colloidal silica-containing gelled particulate, the gelled particulate being within a range from 10 to 30 PHR in solid content in the paint composition; and an alkyltin ester compound of an aliphatic carboxylic acid, the alkyltin ester compound being within a range from 0.1 to 10 PHR in solid content in the paint composition.

Accordingly, the cationic electrodeposition paint composition can provide a high corrosion resistance to the edge portion of a metal plate which has been machined to a wheel of an automotive vehicle, while maintaining a high weatherability.

BRIEF DESCRIPTION OF THE DRAWING

The single figure.

DETAILED DESCRIPTION OF THE INVENTION

Figure 1:
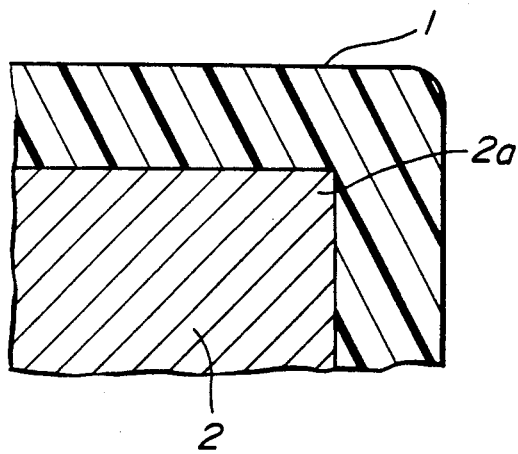
FIG. 1 is a fragmentary sectional view of an automotive vehicle wheel coated with a cationic electrodeposition paint composition in accordance with the present invention.

According to the present invention, a cationic electrodeposition paint composition of the amulsified dispersion type is comprised of an amine-modified epoxy resin, a blocked isocyanate, a nonionic emulsified and dispersed type acrylic resin, a colloidal silica-containing gelled particulate, and an alkyltin ester compound of an aliphatic carboxylic acid. In the above cationic electrodeposition paint composition, the acrylic resin is preferably contained within a range from 5 to 30% by weight in resinous solid content relative to a total resin content of the paint composition. The gelled particulate is preferably contained within a range from 10 to 30 PHR in solid content in the paint composition. The alkyltin ester compound is contained within a range from 0.1 to 10 PHR in solid content in the paint composition. The term "PHR" is an abbreviation of "Parts Per Hundred Resin" which means parts by weight of the component (in solid content) relative to 100 parts by weight of the total resin content of the paint composition.

The above-mentioned amine-modified or amine-added epoxy resin and blocked isocyanate are contained in the state of an emulsified dispersion in the cationic electrodeposition paint composition and serve as basic components. Examples of the amine-modified epoxy resin are an addition compound (I) formed by a reaction between a polyepoxide compound and a primary mono or poly-amine, a secondary mono- or poly-amine, or a primary and secondary mixed polyamine, as disclosed for example in U.S. Pat. No. 3,984,299; an addition compound (II) formed by a reaction between a polyepoxide compound and a secondary mono- or poly-amine having a ketimine-typed primary amino group, as disclosed for example in U.S. Pat. No. 4,017,438; and a reaction product (III) formed by an etherification between a polyepoxide compound and a hydroxyl compound having a ketimine-typed primary amino group, as disclosed for example in Japanese Patent Provisional Publication No. 59-43013.

The polyepoxide compound, which is a raw material of the amine-added epoxy resin, preferably has at least two epoxy groups

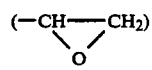

in a molecule and has a number average molecular weight of at least 200. The number average molecular weight is preferably within a range from 400 to 4000, and more preferably from 800 to 2000. Additionally, it is preferable that the polyepoxide compound is produced by a reaction between a polyphenol compound and an epichlorohydrin.

The above-mentioned blocked isocyanate contained in the cationic electrodeposition paint composition is known per se and usually produced by blocking isocyanate groups of a polyisocyanate such as of phenylene diisocyanate, tolylene diisocyanate and hexamethylene diisocyanate with a compound having active hydrogen, such as alcohol, phenol, oxime lactam and diketone.

The cationic electrodeposition paint composition of the present invention further contains the nonionic emulsified and dispersed type acrylic resin, the colloidal silica-containing gelled particulate, and the alkyltin ester compound of an aliphatic carboxylic acid.

The nonionic emulsified and dispersed type acrylic resin is prepared by polymerization or copolymerization of at least one of acrylic monomers, for example, alkyl ester of (meth)acrylate such as methyl (meth)acrylate, ethyl (meth)crylate, butyl (meth)acrylate, propyl (meth)acrylate, 2-ethylhexyl (meth)acrylate; hydroxyalkyl ester of (meth)acrylate such as hydroxyethyl (meth)acrylate and hydroxypropyl (meth)acrylate; glycidyl (meth)acrylate; and (meth)acrylic acid. The acrylic monomer(s) may be copolymerized with at least one of other unsaturated monomers, for example, stylene, derivative of stylene (for example, α-methyl stylene), (meth)acrylonitrile, and butadiene. The selection of the above various monomer(s) is accomplished upon taking the physical properties of the monomers into consideration.

The acrylic resin has a number average molecular weight ranging from about 3000 to about 100,000. The average molecular weight is preferably within a range from about 4000 to about 50,000. In the case where the acrylic resin has hydroxyl groups as functional groups, the acrylic resin may be cross linked to harden upon reaction with a polyisocyanate compound as a cross-linking agent.

The resinous solid content of the acrylic resin in the paint composition is within a range from 5 to 30% by weight, preferably from 10 to 20% by weight, relative to the total resin content of the paint composition If the content is less than 5% by weight, no improvement in weatherability of a coated paint film is recognized. If the content exceeds 30% by weight, corrosition resistance by the coated paint film to a metal object (plate) is lowered.

The colloidal silica-containing gelled particulate is prepared by dispersing in water a mixture of an acrylic copolymer having a hydrolyzable alkoxysilane group and a cationic group and a cationic acidic colloidal silica so as to carry out cross-linking reaction in particles. The acrylic copolymer may be a known acrylic resin which contains the hydrolizable alkoxysilane and the cationic group. The acrylic copolymer or the like usually has an amine value ranging from 10 to 100, a hydroxyl value ranging from 0 to 200, and a number average molecular weight ranging from 7000 to 30,000.

The cationic acidic colloidal silica contains $SiO_2$ as a basic unit and is of a water-dispersed type. The colloidal silica has a preferably average particle size ranging from 0.004 to 0.1 μm. Examples of the cationic acidic colloidal silica are "Adelits CT-300" (the trade name of Asahi Denka Kogyo Kabushiki Kaisha in Japan), "Snowtex O" (the trade name of Nissan Chemical Industries, Ltd. in Japan), and "Cataloid SN" (the trade name of Catalysts & Chemicals Ind. Co., Ltd. in Japan).

The solid content of the colloidal silica-containing gelled particulate in the paint composition is within a range from 10 to 30 PHR, preferably from 15 to 20 PHR. If the content is less than 10 PHR, corrosion resistance of the edge of a cut steel plate coated with the paint composition is deteriorated. If the content exceeds 30 PHR, smoothness (paint stability in a bath) of a coated paint film of the paint composition is degraded.

The alkyltin ester compound of alphatic carboxylic acid is a liquid tin catalyst such as dibutyltin dilaurate, dibutyltin diacetate and dioctyltin diacetate. The solid content of the alkyltin ester compound of aliphatic carboxylic acid in the paint composition is within a range from 0.1 to 10 PHR. preferably from 0.2 to 50 PHR. If the content is less than 0.1 PHR, hardening ability of the coated paint film of the paint composition is low. If the content exceeds 10 PHR, the smoothness of the coated film of the paint composition is degraded.

An example of the usage of the electrodeposition paint composition of the present invention is shown in FIG. 1, in which the cationic electrodeposition paint composition 1 of the present invention is coated on the surface of a steel plate 2 forming a road wheel of an automotive vehicle. The steel plate 2 has an edge portion 2a which is well covered with the paint composition 1.

EXPERIMENT

In order to evaluate the cationic electrodeposition paint composition of the present invention, discussion will be made on a variety of experiments concerning production of the paint composition and Examples and Comparative Examples of the paint composition.

Production 1

Production of amine-modified epoxy resin (A)

| Raw materials (ingredients) | | Part by weight |
|---|---|---|
| 1) | Bisphenol type epoxy resin ("Araldite No. 6071", the trade name of Ciba-Geigy (Japan) Ltd.) | 930 |
| 2) | Bisphenol type epoxy resin ("Araldite GY2600", the trade name of Ciba-Geigy (Japan) Ltd.) | 380 |
| 3) | Polycaprolactone diol ("Placcel No. 205", the trade name of Daicel Chemical Industries Ltd. in Japan) | 550 |
| 4) | Dimethylbenzyl amine acetate | 2.6 |
| 5) | p-nonyl phenol | 79 |
| 6) | Methylisobutylketone ketimine-typed monoethanol amine | 71 |
| 7) | Diethanol amine | 105 |
| 8) | Butyl cellosolve | 180 |
| 9) | Cellosolve | 525 |

The above ingredients 1) to 6) were mixed and reacted at 150° C. for 2 hours to obtain a reaction mixture. Thereafter, the above ingredients 7) to 9) were mixed with the reaction mixture and reacted at 80° to 90° C. for 3 hours thereby obtaining a resinous solution having a solid content of 75% by weight and a surface tension of 53 dyne/cm.

Production 2
    Amine-modified epoxy resin (B-1)

| Raw materials (ingredients) | Part by weight |
|---|---|
| 1) Butyl cellosolve | 26 |
| 2) 80% polyester monomer ("FM-3X", the trade name of Daicel Chemical Industries Ltd. in Japan) | 37.5 |
| 3) Stylene | 40 |
| 4) Hydroxyethyl metacrylate | 25 |
| 5) n-butyl methacrylate | 5 |
| 6) AIBN (azobisisobutyronitrile) | 4 |
| 7) Butyl cellosolve | 5 |
| 8) Azobisdimethyl valeronitrile | 0.5 |
| 9) Cellosolve | 23 |

The above ingredient 1) was heated at 130° C. Then, the above ingredients 2) to 6) inclusive were dropped into the thus heated ingredient 1) throughout 5 hours to produce a reaction mixture. This reaction mixture was maintained at 130° C. for 2 hours. Thereafter, the above ingredients 7) and 8) were dropped into the reaction mixture at 130° C. throughout 2 hours. Subsequently, the above ingredient 9) was added to the reaction mixture, and then the reaction mixture was cooled, thereby obtaining a resinous solution having a solid content of 62% by weight, a number average molecular weight of about 5000 and a surface tension of 40 dyne/cm.

Production 3
    Nonionic acrylic resin (B-2)

| Raw materials (ingredients) | Part by weight |
|---|---|
| 1) Butyl cellosolve | 26 |
| 2) 80% polyester monomer ("FM-3X", the trade name of Daicel Chemical Industries Ltd.) | 87.5 |
| 3) Stylene | 25 |
| 4) Hydroxyethyl acrylate | 5 |
| 5) AIBM (Azobisisobutyronitrile) | 4 |
| 6) Butyl cellosolve | 5 |
| 7) Azobisdimethyl valeronitrile | 0.5 |
| 8) Cellosolve | 23 |

The above ingredient 1) was heated at 130° C. Then, the above ingredients 2) to 5) were dropped into the thus heated ingredient 1) at 130° C. throughout 5 hours to obtain a reaction mixture. The reaction mixture was maintained at 130° C. for 2 hours. Thereafter, the above ingredients 6) and 7) were dropped into the reaction mixture at 130° C. throughout 2 hours. The reaction mixture was maintained at 130° C. for 2 hours. Subsequently, the above ingredient 8) was added to the reaction mixture. The reaction mixture was then cooled to obtain a resinous solution having a solid content of 62% by weight, a number average molecular weight of about 5000 and a surface tension of 35 dyne/cm.

PRODUCTION 4 Micro-gel (Micro-gel A)

Isopropyl alcohol in an amount of 320 parts by weight was supplied to a 1 liter flask equipped with a stirrer, a temperature, a condenser and a heating mantle and heated to a refluxing temperature (about 83° C.) Into this flask, the below listed mixture of monomers and polymerization initiator was dropped at a refluxing temperature of about 83° to 87° C. throughout about 2 hours.

| Mixture | Part by weight |
|---|---|
| Stylene | 272 |
| n-butylacrylate | 224 |
| 2-hydroxyethylacrylate | 80 |
| dimethylaminoethylmethacrylate | 144 |
| KBM-503[a] | 80 |
| Azobisisobutyronitrile | 24 |

Note
[a] KBM-503 is γ-methacryloxy propyltrimethoxy silane and the trade name of Shin-Etsu Chemical Co, Ltd. in Japan.

Subsequently, after stirring for 30 minutes, a solution obtained by dissolving 8 parts by weight of azobis-dimethyl valeronitrile was added to 120 parts by weight of isopropyl alcohol was dropped throughout about 1 hour and stirred for about 1 hour. Thereafter, 320 parts by weight of isopropyl alcohol was added to cool the content in the flask, thus obtaining an acrylic copolymer varnish having a solid content of 51% by weight, an amine value of 64, a hydroxyl value of 48 and a number average molecular weight of about 20,000.

The thus obtained acrylic copolymer varnish in an amount of 480 parts by weight was supplied into a 2 liter flask. Into this flask, 196 parts by weight of a cationic acidic colloidal silica "Adelites CT-300 (the trade name of Asahi Denka Kogyo Kabushiki Kaisha)" having a solid content of 20% by weight and 4.0 parts by weight of acetic acid were added and stirred at about 30° C. for 5 minutes. Therafter, 740 parts by weight of deionized water was dropped under strong stirring throughout about 30 minutes, and then stirred for about 3 hours upon raising the temperature to 75° to 80° C., thus obtained a dispersion liquid "Micro-gel A") of the cationic acidic colloidal silica-containing gelled particulates in which cross-linking was made in the particulate, the dispersion liquid being milk white and having a solid content of 20% by weight. The particulates have an average particle size of 0.08 μm.

PRODUCTION 5 Another Micro-Gel ("Micro-Gel B")

An acrylic copolymer varnish was obtained by using the below-listed mixture of monomers in a manner similar to that in Production 4.

| Mixture | Part by weight |
|---|---|
| Stylene | 304 |
| n-butylmethacrylate | 280 |
| 2-hydroxyethylacrylate | 80 |
| dimethylaminopropylacrylamide | 56 |
| KBM-503 | 80 |

The obtained cyclic copolymer varnish had a solid content of 50% by weight, an amine value of 25, a hydroxyl value of 48 and a number average molecular weight of about 15000.

The acrylic copolymer varnish in amount of 490 parts by weight was supplied into a 2 liter flask. Into this flask, 196 parts by weight of a cationic acidic colloidal silica "Adelits CT-400 (the trade name of Asahi Denka Kogyo Kabushiki Kaish)" having a solid content of 20% by weight and 3.4 parts by weight of acetic acid were added and stirred at about 30° C. for 5 minutes. Thereafter, 732 parts by weight of deionized water was dropped under strong stirring throughout about 30 minutes, and then stirred for about 4 hours upon raising the temperature to 50° C., thus obtaining a dispersion liquid ("Micro gel B") of the cationic acidic colloidal silica-containing gelled particulates in which cross-linking was made in the particulate, the dispersion liquid being milk white and having a solid content of 20% by weight. The particulates have an average particle size of 0.10 μm.

PRODUCTION 6 Pigment Paste

Ingredients shown in the following table were mixed with each other to obtain pigment pastes A and B having a nonvolatile content of 50% by weight (upon heating at 120° C. for 1 hour).

| Ingredient | Pigment paste | |
|---|---|---|
| | Paste A (gray) | Paste B (black) |
| 60% quaternary epoxy resin chloride | (part by weight) 5.73 | (part by weight) 5.73 |
| Titanium white | 14.5 | — |
| Carbon black | 0.54 | 3.0 |
| Extender pigment (clay) | 7.0 | 16.6 |
| Lead silicate | 2.3 | 2.3 |
| Deionized water | 25.49 | 23.07 |
| Total | 55.56 | 50.70 |

EXAMPLES AND COMPARATIVE EXAMPLES

A variety of cationic electrodeposition paint compositions were prepared by mixing the modified epoxy resins (EP), the nonionic acrylic resins (AC), the microgels (MG), the pigment pastes prepared according to Productions 1 to 6 and the following blocked isocyanates and alkyltin ester compound:

Blocked isocyanate:
(A): 4, 4'-diphenylmethane diisocyanate di-blocked with ethyleneglycol mono-2-ethylhexylether
(B): Isophorone diisocyanate di-blocked with methylethylketone ketooxime Alkyltin ester compound (Liquid tin compound):
(A): Dibutyltin diacetate
(B): Dibutyltin laurate Note: A term "di-blocked" means that two functional groups of a compound are blocked with blocking agent.

EXAMPLE 1

| Raw materials (ingredients) | Part by weight |
|---|---|
| 1) Amine-modified epoxy resin (A) | 96.8 (72.6)$^{a)}$ |
| 2) Blocked isocyanate (A) | 5.0 (5.0) |
| 3) Blocked isocyanate (B) | 12.4 (12.4) |
| 4) Nonionic acrylic resin (B-1) | 16.1 (10.0) |
| 5) Alkyltin ester compound (A) | 1.0 (1.0) |
| 6) Polypropylene glycol 4000$^{b)}$ | 0.5 (0.5) |
| 7) Lead acetate | 1.0 (1.0) |
| 8) 10% acetic acid | 9.3 |
| 9) Deionized water | 178.2 |
| Total | 320.3 (102.5) |

Note:
$^{a)}$A value within ( ) represents a solid content.
$^{b)}$"4000" means an approximate value of molecular weight.

The above ingredients 1) to 6) were homogeneously mixed with each other to prepare a mixture. Then the above ingredients 7) and 8) were added to the mixture and mixed homogeneously with each other. Subsequently, the above ingredient 9) was added to the mixture, which was stirred to homogeneously mix the mixture, thus obtaining an emulsion having a non-volatile content of 32% by weight (upon heating at 120° C. for 1 hour). 320.3 parts by weight of this emulsion, 55.56 parts by weight of the pigment paste (A), 30 parts by weight (15 parts by weight in solid content) of the micro-gel A and 275.54 parts by weight of the deionized water were mixed with each other, thereby obtaining a cationic electrodeposition paint composition having a solid content of 20% by weight. The components and the solid contents thereof are shown in Table 1.

EXAMPLES 2 to 8 and COMPARATIVE EXAMPLES 1 to 6

A cationic electrodeposition paint composition having a solid content of 20% by weight was obtained in a manner similar to that in Example 1 except for using components and solid contents thereof shown in Table 1.

EVALUATION TEST

An electrically conductive object (steel plate) to be coated was dipped in an electrodeposition bath (temperature: 28° C.) containing each of the above-mentioned cationic electrodeposition paint compositions of Examples 1 to 8 and Comparative Examples 1 to 6 to accomplish an electrodeposition painting. This which was conducted according to a painting method discussed below, in which electric current at a voltage to obtain a coated film having a thickness of 20 μm upon baking was passed for 3 minutes between the object (serving as a cathode) and an anode. The thus obtained coated film corresponding to each of Examples and Comparative Examples was subjected to evaluation tests according to testing method discussed below thereby to evaluate the characters and performances of the coated paint film. The results of the evaluation tests are shown in Table 1.

PAINTING METHOD

The electrodeposition paint composition of each of Examples 1 to 8 and Comparative Examples 1 to 6 was supplied to a vessel made of vinyl chloride. The object (mentioned below) to be coated was dipped in the electrodeposition paint in the vessel to serve as a cathode, with an anode also dipped in the paint. Then, a cationic electrodeposition was conducted by passing electric current at a predetermined voltage between the object and the anode. After completion of the electrodeposition, the coated object was baked under a condition mentioned below to obtain a coated paint film which was hardened, thus preparing a specimen to be subjected to the evaluation tests.

The object to be coated: (1) A steel plate (SPCC according to Japanese Industrial Standard G3141) having dimensions of 150 mm × 70 mm × 0.8 mm; and (2) A steel cutter knife blade which had been treated with zinc phosphate before the electrodeposition painting.

The baking condition: 170° C. and 20 minutes

TESTING METHOD FOR EVALUATION TEST (1) Corrosion resistance

A salt water spraying test according to Japanese Industrial Standard Z2371 was conducted on each specimen obtained from the above painting method. Regarding the specimen of the SPCC steel plate, the salt water spraying test was carried out for 1000 hours after a cut is formed on the surface of the coated paint film by a cutter knife to a depth reaching the steel plate. Then, the degree of production of red rust was observed to evaluate a corrosion resistance of the coated paint film to the steel plate. Regarding the specimen of the cutter knife blade, the salt water spraying test was carried out for 168. Then, the degree of production of red rust was observed to evaluate a corrosion resistance of the coated paint film to the steel plate. Evaluation of the corrosion resistance is shown in Table 1.

WEATHERABILITY TEST

An accelerated weatherability test according to Japanese Industrial Standard D0205 was conducted for 100 hours on the specimen obtained in accordance with the above painting method. After the accelerated weatherability test, the degree of chalking of the surface of the coated paint film was observed to evaluate the weatherability of the specimen. Evaluation of the weatherability is shown in Table 1.

SMOOTHNESS OF COATED PAINT FILM

Measurement of a surface roughness of the coated paint film was conducted on the coated paint film of the specimen obtained in accordance with the above painting method by using a surface roughness tester "Surf Roughness Tester 401" produced by Mitutoyo Co., Ltd. in Japan, thereby evaluating the smoothness of the coated paint film of the specimen. Evaluation of the smoothness is shown in Table 1.

TABLE 1

| | Epoxy resin (EP)/ Acrylic resin (AC) | | Micro-gel (MG) | | Alkyltin ester | |
|---|---|---|---|---|---|---|
| | Component | Solid content (part by wt.) | Component | Solid content (part by wt.) | Component | Solid content (part by wt.) |
| Example 1 | A/B-1 | 72.6/10 | A | 15 | A | 1 |
| Example 2 | A/B-1 | 72.6/10 | A | 15 | A | 1 |
| Example 3 | A/B-1 | 72.6/10 | B | 15 | A | 1 |
| Example 4 | A/B-1 | 72.6/10 | A | 15 | B | 1 |
| Example 5 | A/B-1 | 72.6/10 | A | 15 | B | 1 |
| Example 6 | A/B-2 | 72.6/10 | A | 15 | A | 1 |
| Example 7 | A/B-2 | 62.6/20 | A | 15 | A | 1 |
| Example 8 | A/B-2 | 62.6/20 | A | 20 | A | 1 |
| Comparative Example 1 | A/B-1 | 81.6/1 | A | 15 | A | 1 |
| Comparative Example 2 | A/B-1 | 42.6/40 | A | 15 | A | 1 |
| Comparative Example 3 | A/B-1 | 72.6/10 | A | 5 | A | 1 |
| Comparative Example 4 | A/B-1 | 72.6/10 | A | 40 | A | 1 |
| Comparative Example 5 | A/B-1 | 72.6/10 | A | 15 | A | 0.05 |
| Comparative Example 6 | A/B-2 | 47.6/35 | A | 15 | A | 1 |

| | Pigment paste | | Weather- ability | Corrosion resistance | | Smoothness |
|---|---|---|---|---|---|---|
| | Component | Solid content (part by wt.) | | Steel plate | Knife blade | |
| Example 1 | A | 27.8 | Good | Good | Good | Good |
| Example 2 | A | 27.8 | Good | Good | Good | Good |
| Example 3 | A | 27.8 | Good | Good | Good | Good |
| Example 4 | A | 27.8 | Good | Good | Good | Good |
| Example 5 | B | 27.8 | Good | Good | Good | Good |
| Example 6 | A | 27.8 | Good | Good | Good | Good |
| Example 7 | A | 27.8 | Good | Good | Good | Good |
| Example 8 | A | 27.8 | Good | Good | Good | Good |
| Comparative Example 1 | A | 27.8 | Bad | Good | Good | Good |
| Comparative Example 2 | A | 27.8 | Good | Bad | Not Good | Good |
| Comparative Example 3 | A | 27.8 | Good | Good | Bad | Good |
| Comparative Example 4 | A | 27.8 | Good | Good | Good | Bad |
| Comparative Example 5 | A | 27.8 | Good | Bad | Not Good | Good |
| Comparative Example 6 | A | 27.8 | Good | Not Good | Good | Good |

What is claimed is:

1. A cationic electrodeposition paint composition, comprising:
   an amine-modified epoxy resin;
   a blocked isocyanate;
   a nonionic emulsified and dispersed acrylic resin, said acrylic resin being within a range from 5 to 30% by weight in resinous solid content relative to a total resin content of the paint composition;
   a colloidal silica-containing gelled particulate, said gelled particulate being within a range from 10 to 30 PHR in solid content in the paint composition, said colloidal silica-containing gelled particulate being formed by dispersing a mixture of an acrylic copolymer having a hydrolyzable alkoxysilane group and a cationic group and cationic acidic colloidal silica in water to carry out a cross-linking reaction; and
   an alkyltin ester compound of an aliphatic carboxylic acid, said alkyltin ester compound being within a range from 0.1 to 10 PHR in solid content in the paint composition.

2. A cationic electrodeposition paint composition as claimed in claim 1, wherein said amine-modified epoxy resin is produced from an epoxide compound having a number average molecular weight of at least 200.

3. A cationic electrodeposition paint composition as claimed in claim 1, wherein said blocked isocyanate is produced from an isocyanate selected from the group consisting of phenylene diisocyanate, tolylene diisocyanate and hexamethylene diisocyanate.

4. A cationic electrodeposition paint composition as claimed in claim 1, wherein said nonionic emulsified and dispersed acrylic resin is made of at least one monomer selected from the group consisting of methyl (meth)acrylate, ethyl (meth)acrylate, butyl (meth)acrylate, propyl (meth)acrylate, 2-ethylhexyl (meth)acrylate, hydroxyethyl (meth)acrylate, hydroxypropyl (meth)acrylate, glycidyl (meth)acrylate and (meth)acrylic acid.

5. A cationic electrodeposition paint composition as claimed in claim 1, wherein said nonionic emulsified and dispersed acrylic resin has a number average molecular weight ranging from about 3000 to about 100,000.

6. A cationic electrodeposition paint composition as claimed in claim 1, wherein the second acrylic copolymer has an amine value ranging from 10 to 100, a hydroxyl value ranging from 0 to 200 and a number average molecular weight ranging from 7000 to 30,000.

7. A cationic electrodeposition paint composition as claimed in claim 1, wherein said colloidal silica-containing gelled particulate has an average particle size ranging from 0.004 to 0.1 μm.

8. A cationic electrodeposition paint composition as claimed in claim 1, wherein said alkyltin ester compound is selected from the group consisting of dibutyltin dilaurate, dibuyltin diacetate and dioctyltin diacetate.

* * * * *